Figure 1:
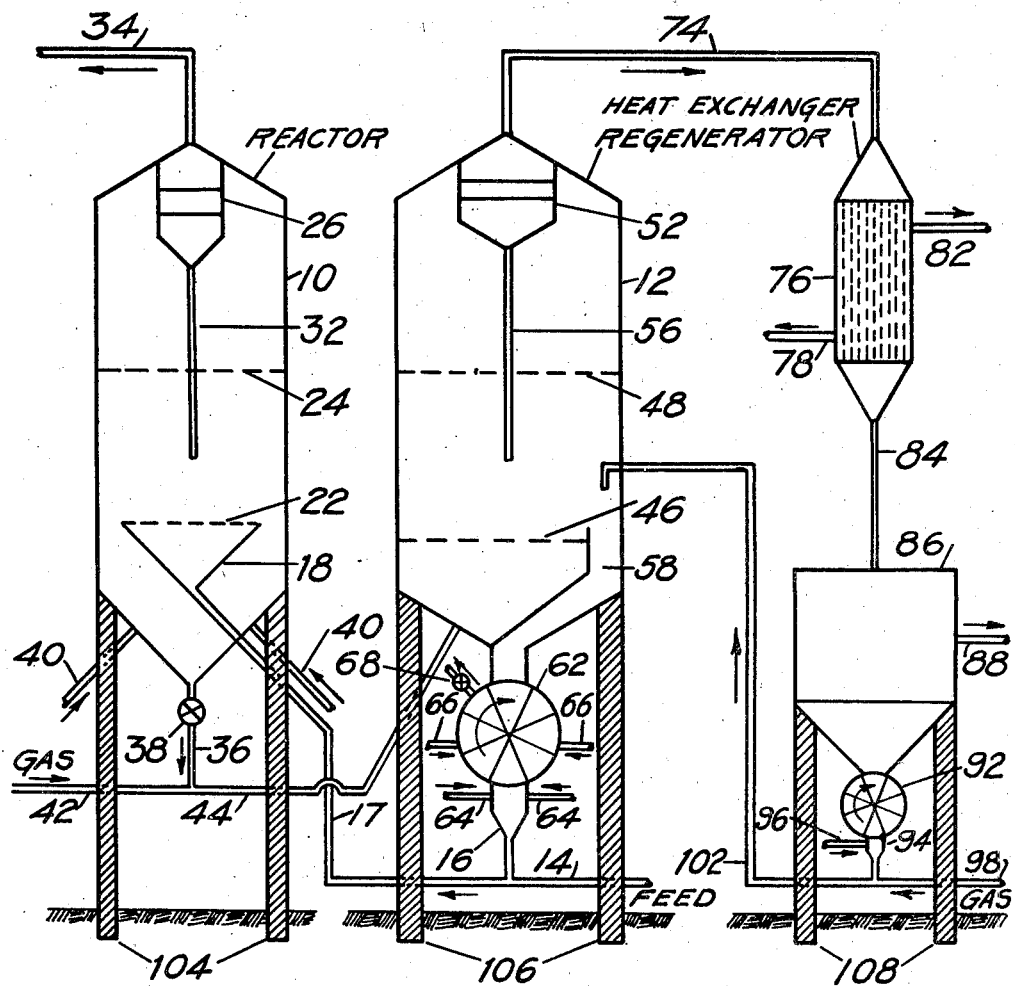

Patented Apr. 27, 1948

2,440,482

UNITED STATES PATENT OFFICE 2,440,482

PROCESS AND APPARATUS FOR CONTACTING FLUIDS WITH POWDERED SOLIDS

Homer Z. Martin, Roselle, N. J., assignor to Standard Oil Development Company, a corporation of Delaware Application December 15, 1943, Serial No. 514,324

6 Claims. (Cl. 196—52)

This invention relates to contacting fluids with powdered solids, and more particularly, relates to treating hydrocarbon fluids in the presence of powdered solid materials.

My invention may be used for catalytic reactions using powdered catalyst and reactant vapors or gases, or contacting gases and vapors with powdered contacting material, for regenerating spent catalyst by contacting the spent catalyst with regenerating gas or gases, for treating powdered solids where a physical or chemical change takes place in the solids, etc. My invention is especially adapted for the catalytic conversions of hydrocarbons and regeneration of catalyst particles but may be used in other processes in which powdered catalyst or powdered solid material is circulated from one zone to another where one zone is under a higher pressure than the other zone.

The powdered material is handled best as a dry fluidized or aerated mixture so that it has some of the characteristics of a liquid. All previous designs on fluidized solids equipment have been subject to some objections. For example, those designs using screw conveyors or screw pumps are subject to excessive agglomeration of the catalyst particles and excessive wearing of the screw pump itself.

According to my invention, the reaction zones or vessels are supported substantially at ground level and standpipes, screw feeds, and lock hoppers for building up pressure are eliminated. One or more star feeders are used for sealing one reaction vessel from another. Where powdered material is separated from vent gases by means of a Cottrell precipitator, I place the Cottrell precipitator substantially at ground level and use a star feeder to pass the recovered powdered material to a zone of higher pressure and return it to the system. Placing the Cottrell precipitator substantially at ground level saves in construction costs because the Cottrell precipitator is a large piece of equipment and where standpipes are used, the Cottrell precipitator is supported at a relatively high level to feed the recovered powdered material into a standpipe for building up pressure to return the recovered powdered material to the system. By "substantially at ground level" is meant only a distance above the ground level necessary to allow for safe and adequate supporting of the zones or vessels, e. g. about 20 feet in the case of the Cottrell precipitator, as compared with 100 feet in designs wherein a standpipe is used for generating pressure.

According to a specific form of my invention, one zone or vessel is at a higher pressure than the other zone or vessel, and powdered material is withdrawn in a relatively dense fluid phase from the higher pressure zone or vessel through a slide valve and passed to the other zone or vessel. Powdered material from the bottom of the low pressure zone or vessel is withdrawn in a dense fluid phase and passed through a star feeder into a high pressure chamber where pressure is maintained by the introduction of inert gas and the powdered material is then returned to the higher pressure zone or vessel.

Figure 2:
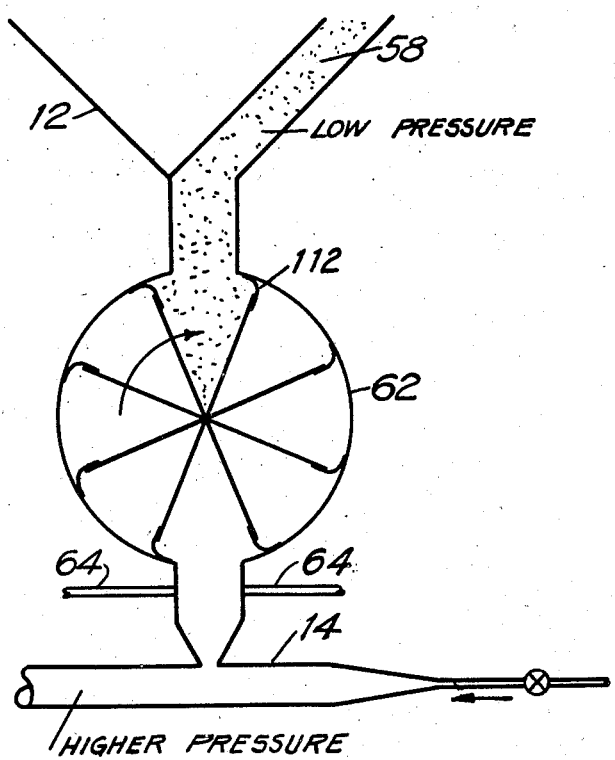

In the drawing,

Fig. 1 represents one form of apparatus which may be used in carrying out my invention; and Fig. 2 represents one form of star feeder which may be used.

Referring now to the drawing, the reference character 10 designates a reaction vessel and reference character 12 designates a regeneration vessel. My invention will be specifically described in connection with catalytic cracking of hydrocarbons, but it is to be understood that my invention is not limited thereto. Hydrocarbon oil is vaporized in any suitable furnace and hydrocarbon oil vapors at a temperature of about 750° F. to 1050° F. are passed through line 14 and mixed with a suitable cracking catalyst introduced from pressure chamber 16.

The cracking catalyst may be acid-treated bentonite, synthetic silica alumina or silica magnesia gels, etc. The catalyst is preferably in powdered form having a size between about 200 and 400 standard mesh or finer. While powdered catalysts are preferred, my process can be applied to cases wherein larger sized catalyst or contact particles are to be used, for example as large as approximately 7 mesh. About 10 parts by weight of catalyst to one part of oil are used. This ratio may vary between about 1.0 and 25. The catalyst particles withdrawn from the pressure chamber 16 are regenerated catalyst particles at a temperature of about 1100° F.

The mixture of oil vapors and catalyst is passed through line 17 into a distributing chamber 18 having a distribution plate or grid 22. The chamber 18 and the grid 22 are located in the reaction vessel 10. The velocity of the vapors is selected to maintain a relatively dense phase of catalyst particles in dry suspension or in dry fluidized condition. The fluidized mixture has a level 24 similar to a level of liquid. The fluidized catalyst mixture is a dry mixture and has a density of about 10 to 25 lbs./cu. ft.

The vaporous reaction products leave the dense catalyst mixture and pass upwardly through separating means 26 located inside the upper portion of the reaction zone 10. The separating means may be a cyclone separator, a Multi-clone separator, or the like, for separating entrained catalyst particles from dry vaporous reaction products. The separated solid particles are returned through line 32 to the fluidized mass or mixture of catalyst below the level 24 in the reaction zone 10. The vaporous reaction products leave the separating means through line 34 and are passed to suitable fractionating equipment and associated equipment not shown.

During the conversion the catalyst particles become coated with coke or carbonaceous material and the spent catalyst in dry condition is withdrawn from the bottom of the reaction zone 10 through line 36 having a slide valve 38 for controlling the rate of withdrawal of the spent catalyst from the reaction vessel 10. Lines 40 are provided for introducing a stripping gas, such as steam, into the spent catalyst below the distribution plate 22 to remove hydrocarbons from the spent catalyst.

Regenerating gas, such as air, is passed through line 42 and mixed with the spent catalyst from line 36 and the mixture passed through line 44 into the bottom portion of the regeneration vessel 12. The mixture is introduced below distribution plate or grid 46 which acts to evenly distribute the spent catalyst across the area of the regeneration zone or vessel. The velocity of the regenerating gas is controlled to maintain a relatively dense fluidized mixture in the regeneration zone. The relatively dense mixture has a level 48 which is similar to that of a liquid. During regeneration, the temperature is maintained below about 1150° F. to avoid partial inactivation or total inactivation of the catalyst particles.

The regeneration gases leave the dense mixture and pass upwardly through separating means 52 located in the upper portion of the interior of the regeneration vessel 12 to separate solid particles from regeneration gases. The separating means may be a cyclone separator, a Multi-clone separator, or the like. The separated and recovered catalyst particles are returned to the dense mixture of catalyst in the regeneration vessel 12 through line 56 below the level 48 therein.

The regenerated catalyst is withdrawn as a dry fluidized dense mixture through well 58 which extends above the distribution plate 46 but is below the level 48.

During passage through the slide valve 38, the distribution plate 46 and the bed of catalyst in the regeneration vessel 12, there is a drop in pressure which must be restored to the catalyst before it is again returned to the reaction vessel 10. A pressure seal is maintained by means of a star feeder 62 arranged below the regeneration vessel 12 and communicating with the bottom of the well 58. The star feeder is continuously rotated as shown by the arrow and removes regenerated catalyst from the well 58 and drops it into the pressure chamber 16 directly beneath the star feeder. Inert gas is introduced into the pressure chamber 16 through line 64 to maintain an increased pressure in the pressure chamber 16.

It is important to prevent blow-back of oil vapors from line 14 through the star feeder 62 into the regeneration zone and therefore the pressure in the pressure chamber 16 must be sufficient to avoid seepage of oil vapors upwardly through the star feeder. This is brought about as indicated above by the addition of inert gas to the pressure chamber 16 through line 64 and adjusting the pressure in chamber 16 to be slightly above that in the space immediately below where the oil is being introduced into the cracking system. A slight restriction in the piping connecting zone 16 to the oil inlet line will suffice to allow maintenance of this slightly increased pressure with the addition of a moderate quantity of inert gas through line 64, or 66, as described immediately below.

In some cases it may be desirable to introduce inert sealing gas through lines 66 into the star feeder at a pressure greater than that in the pressure chamber 16 and the regeneration vessel 12 so that inert gas may flow in both directions, thus preventing blow-back of oil vapors through the star feeder. If desired, a pressure release line 68 may be provided above the line 66 on the left-hand side of the star feeder shown in Fig. 1 to release superatmospheric pressure. By providing this pressure release the excess gas above that which would exist under the pressure in the bottom of the regenerator is removed from the rising compartment and will not blow back against the downcoming stream of catalyst from the regenerator, when the compartment reaches the top of the star feeder. In this way the filling of the compartment with catalyst is facilitated. The gas released through connection 68 may be discharged to either the reactor or the regenerator so that any catalyst it contains may be recovered. Indeed, in some cases, it is desirable to connect the release to a vessel of low pressure, such as the Cottrell or the top part of the regenerator. In this way a rather low pressure is obtained on the compartment just before it reaches the top of the feeder, still further increasing the rate at which the compartments become filled with catalyst.

Returning now to the regeneration vessel 12, the hot regeneration gases leave the separating means 52 through line 74. These gases are at a relatively high temperature, and in order to recover heat from these gases, they are passed through a heat exchanger 76 which may be a waste heat boiler. The liquid or fluid to be heated is introduced through line 78 and the heated liquid or vapors are withdrawn through line 82. The regeneration gases and the heat exchange medium are in indirect heat exchange relationship.

The cooled regeneration gases contain entrained catalyst particles and they are passed through line 84 to a Cottrell precipitator 86 for recovering catalyst particles therefrom. The separated flue gas is passed from the Cottrell precipitator through line 88 and may be vented to the atmosphere. The separated and recovered catalyst particles drop into the bottom of the Cottrell precipitator from which they are removed by a star feeder 92 which is continuously rotated in the direction of the arrow.

The regenerated gases in passing through the separating means 52, the heat exchanger 76, and the Cottrell precipitator 86 lose some pressure due to the pressure drop through these elements, and it is necessary to build up the pressure before returning the catalyst particles to the regeneration vessel 12. The catalyst particles from the star feeder are passed to a second pressure chamber 94 below the star feeder 92 into which gas or inert gas under pressure is introduced through line 96. Air as a conveying means is passed through line 98 and is mixed with the recovered catalyst under increased pressure from the pressure chamber 94 and the mixture is passed through line 102 to the body of the dense mixture of catalyst in the regeneration vessel 12 below the level 48 therein. If desired, the catalyst particles in line 102 may be directly introduced into the well 58 so that they are withdrawn with the regenerated catalyst passing to the reaction zone 10.

The reaction vessel 10 is supported on concrete, or the like, piers 104. The regeneration zone or vessel 12 is supported substantially at ground level by concrete piers, or the like, 106. The Cottrell precipitator is supported substantially at ground level by concrete piers, or the like, 108. By supporting the apparatus in the manner described, simple fluid pressure chambers 16 and 94 have been found effective for generating pressure, as contrasted with the usual 100 foot standpipes for this purpose.

In the specific form of the invention above described, the reaction vessel is under pressure of about 5 to 10 lbs./sq.in., preferably 10 lbs., and the regeneration vessel 12 is under a pressure of about 0 to about 5 lbs./sq.in., preferably 5 lbs./sq.in. From this it will be seen that the two vessels are under different pressures and the flow from the zone or vessel of higher pressure to the zone or vessel of lower pressure is readily controlled. The reaction vessel 10 is provided with a slide valve 38 which provides a pressure drop on the mixture passing therethrough and the pressure on the air stream in line 42 is less than the pressure above slide valve 38, and therefore there is no danger of blow-back of regenerating gas through the valve 38 and into the reaction vessel 10.

The regenerated catalyst withdrawn from the bottom of regeneration vessel 12 is at a lower pressure and it is necessary to increase the pressure on the regenerated catalyst before returning it to the reaction vessel 10. This is done with the star feeder 62 and pressure chamber 16 above described. In order to prevent seepage of oil vapors around the vanes of the star feeder into the regeneration vessel 12, the ends of the vanes may be provided with replaceable sealing members 112 as shown in Fig. 2. These sealing members are made of flexible material, such as spring steel, and will probably be more successful in operation in the lower temperature applications, such as at the bottom of the hopper of the Cottrell precipitator.

Instead of having the reaction zone at the higher pressure, it is within the contemplation of my invention to have the regeneration vessel 12 at a higher pressure than the reaction vessel, in which event the star feeder would be underneath the reaction vessel and the slide valve would be underneath the regeneration vessel. By having the regeneration vessel under a higher superatmospheric pressure than in the reaction vessel, the regeneration vessel may be made considerably smaller in diameter than in the case where the regeneration is carried out at substantially atmospheric pressure. The preferred design, however, is to have the reaction vessel at the higher pressure and the regeneration vessel at some pressure between atmospheric and that existing in the reaction vessel.

Instead of using oil vapors at reaction temperatures in line 14, it is within the contemplation of my invention to use partly preheated liquid oil and mixing it with sufficient catalyst at a high temperature to supply the heat of vaporization and conversion by the catalyst. With such an arrangement it is necessary to use larger amounts of catalyst or catalyst plus inert powdered material, and a larger star feeder will be necessary for feeding the larger amount of powdered material from the bottom of the regeneration vessel 12. Preferably oil vapors are fed through line 14 rather than liquid oil or partly preheated liquid oil.

Instead of having the bottom draw-off vessels as shown in Fig. 1, it is within the contemplation of my invention to use upflow reaction and regeneration vessels in which all of the catalyst passes overhead with the vapors or gases. With such an arrangement, the catalyst is maintained in a relatively dense condition in the vessels as described in connection with Fig. 1. However, all of the catalyst passes overhead and it is necessary to have additional separating means and hoppers for collecting the separated catalyst from the separating means. In designs now in use with such an arrangement, the hoppers are placed in elevated positions and feed the collected powdered material to standpipes for building up pressure on the catalyst. According to my invention, the hoppers would be substantially at ground level and star feeders would be used to feed the material into pressure chambers as above described in connection with the pressure chamber 16 below the star feeder 62. In this way much structural steel would be saved because the large pieces of the system would be substantially at ground level.

In the designs now in use wherein standpipes are used, the Cottrell precipitator is placed at a relatively high level because the collected material from the Cottrell precipitator is passed into a standpipe for building up the pressure on the recovered catalyst. With my invention, the standpipes could be used with the reaction vessel and regeneration vessel but the Cottrell precipitator could be arranged substantially at ground level and a star feeder used at the bottom of the hopper of the Cottrell precipitator for building up pressure on the recovered catalyst for returning it to the regeneration vessel or other place in the system. The Cottrell precipitator is a relatively large piece of equipment and requires a large amount of structural steel to support it at a height of, say, about 80–100 ft. With my invention the Cottrell precipitator would be substantially at ground level and it would be much cheaper to support the Cottrell precipitator at this low level.

In the operation of a powdered catalyst unit there is always loss of catalyst during the operation of the unit and it is necessary to replace lost catalyst with fresh catalyst. This is done by operating hoppers as blow cases or using screw conveyors or screw pumps or bucket elevators with storage hoppers. Instead of this equipment, the bottom of the storage hoppers could be supplied with star feeders and the catalyst or powdered material may be blown from the bottom of the star feeder to any desired point in the system.

Blow-back of catalyst or powdered material or gas through the star feeder used in connection with the Cottrell precipitator or in connection with the storage hoppers is less serious than in the other cases.

In the units now in operation using standpipes, it is necessary to have air compressors for supplying air under relatively high pressures. The air compressors can be replaced in my system with a fan inasmuch as the high pressures are not required in the regeneration system or in the standpipes. Because the large pieces of equipment are substantially at ground level, the pressure drops through the equipment are relatively small and it is not necessary to build up large pressures.

My invention may also be used in other processes using powdered solids, such as catalytic polymerization, catalytic dehydrogenation, aromatization, alkylation, or other catalytic hydrocarbon conversion processes, oxidation of gases, such as $SO_2$ to $SO_3$, chlorination of hydrocarbons or other organic or inorganic compounds, treating hydrocarbon distillates with powdered clay or other powdered treating contact material, etc.

While my invention has been specifically described in connection with the catalytic cracking of hydrocarbons, it is to be understood that this is by way of example only and various changes and modifications may be made for adapting my invention to other processes without departing from the spirit of my invention.

I claim:

1. A process for contacting powdered solids with gaseous fluids which comprises maintaining a reaction zone and a regeneration zone substantially at ground level, maintaining a body of dry fluidized solid particles in each of said zones, maintaining one zone under higher superatmospheric pressure than the other zone, removing fluidized solid particles from the bottom of said higher pressure zone and passing them through a constriction whereby a drop in pressure occurs, then mixing the withdrawn particles with a gaseous fluid and passing the mixture to said lower pressure zone, removing dry fluidized solid particles from the bottom of said lower pressure zone and passing them into a chamber, introducing a fluid under pressure into said chamber to raise the pressure on the solid particles, maintaining a pressure seal between said lower pressure zone and said chamber, removing the solid particles from said chamber and mixing a gaseous fluid therewith, the pressure in said chamber being sufficient to prevent seepage of the last mentioned gaseous fluid into the said lower pressure zone and to pass the last mentioned mixture to said higher pressure zone, and removing gaseous fluid from each of said zones.

2. A process according to claim 1 wherein the gaseous fluid from one of said zones contains entrained solid particles and this gaseous fluid is passed to a Cottrell precipitator supported substantially at ground level to recover entrained solid particles, and wherein the said particles are introduced into a chamber maintained under pressure for building up pressure on the particles before returning them to one of said zones, and wherein a pressure seal is maintained between said Cottrell precipitator and said last mentioned chamber.

3. A process according to claim 1 wherein the solid particles are cracking catalyst and the gaseous fluid mixed with the solid particles from the chamber is a hydrocarbon which is passed to said reaction zone and the gaseous fluid passing to the regeneration zone comprises an oxygen-containing gas.

4. A process according to claim 1 wherein the solid particles comprise hydrocarbon conversion catalyst and the gaseous fluid leaving said regeneration zone comprises regeneration gas containing entrained catalyst which is passed to a Cottrell precipitator supported substantially at ground level for recovering entrained catalyst particles, the recovered catalyst particles being passed through a chamber maintained under pressure before being returned to said regeneration zone, and a pressure seal is maintained between said last mentioned chamber and said Cottrell precipitator.

5. An apparatus of the character described including a higher pressure vessel and a lower pressure vessel located substantially at ground level, each vessel being adapted to hold dry fluidized solid particles and having a top outlet for gaseous fluids and a bottom outlet for fluidized solid particles, said higher pressure vessel having a slide valve in its bottom outlet, said lower pressure vessel having a star feeder in its bottom outlet, a fluid pressure chamber below said star feeder, means for supplying fluid under pressure to said pressure chamber, means for mixing a gaseous fluid with solid particles from said pressure chamber and passing the mixture to said higher pressure vessel and means for mixing a gaseous fluid with solid particles from below said slide valve and passing the mixture to said lower pressure vessel.

6. An apparatus of the character described including a reaction vessel, a regeneration vessel, a top outlet and a bottom outlet for each chamber, said vessels being adapted to contain powdered solids in fluidized condition, means whereby powdered material is withdrawn from each of said vessels and passed to the other vessel, a Cottrell precipitator communicating with the top outlet of said regenerator vessel, said Cottrell precipitator being located substantially at ground level and being provided with a star feeder and a fluid pressure chamber below the same in its outlet, and means for supplying fluid under pressure to said fluid pressure chamber for placing powdered solids recovered in said Cottrell precipitator under pressure sufficient to return them to said regeneration vessel.

HOMER Z. MARTIN.

REFERENCES CITED

The following references are of record in the file of this patent:

UNITED STATES PATENTS

| Number | Name | Date |
|---|---|---|
| 1,984,380 | Odell | Dec. 18, 1934 |
| 2,290,580 | Degnen et al. | July 21, 1942 |
| 2,304,827 | Jewell | Dec. 15, 1942 |
| 2,305,569 | Degnen | Dec. 15, 1942 |
| 2,310,377 | Voorhees | Feb. 9, 1943 |
| 2,327,175 | Conn | Aug. 17, 1943 |
| 2,337,684 | Scheineman | Dec. 28, 1943 |
| 2,340,878 | Holt et al. | Feb. 8, 1944 |
| 2,341,193 | Scheineman II | Feb. 8, 1944 |
| 2,349,574 | Conn II | May 23, 1944 |
| 2,349,575 | Voorhees | May 23, 1944 |
| 2,353,731 | Kanhofer | July 18, 1944 |
| 2,358,888 | Thomas | Sept. 26, 1944 |